(12) United States Patent
Virgin (10) Patent No.: US 8,544,805 B2
(45) Date of Patent: Oct. 1, 2013

(54) MOUNTING SYSTEM FOR REMOVABLY SECURING AN OBJECT TO A SURFACE

(75) Inventor: William Kyle Virgin, Blacklick, OH (US)

(73) Assignee: Virgian, LLC, Blacklick, OH (US)

( * ) Notice: Subject to any disclaimer, the term of this patent is extended or adjusted under 35 U.S.C. 154(b) by 232 days.

(21) Appl. No.: 12/856,008

(22) Filed: Aug. 13, 2010

(65) Prior Publication Data

US 2011/0290965 A1    Dec. 1, 2011

Related U.S. Application Data

(60) Provisional application No. 61/349,463, filed on May 28, 2010.

(51) Int. Cl.
*A47B 96/06* (2006.01)

(52) U.S. Cl.
USPC ............ 248/222.11; 248/205.3; 248/316.7; 248/222.13

(58) Field of Classification Search
USPC ............ 248/205.3, 316.7, 222.11, 222.13, 248/221.11, 222.53; 160/368.1; 224/197
See application file for complete search history.

(56) References Cited

U.S. PATENT DOCUMENTS

| | | | | |
|---|---|---|---|---|
| 3,564,984 A * | 2/1971 | Alexander | ............... | 359/551 |
| 3,640,497 A * | 2/1972 | Waki | ............... | 248/220.41 |
| 3,860,209 A * | 1/1975 | Strecker | ............... | 410/116 |
| 3,908,949 A * | 9/1975 | Larson | ............... | 248/220.43 |
| 3,960,352 A | 6/1976 | Plattner et al. | | |
| 4,026,508 A * | 5/1977 | Ziegler | ............... | 248/220.22 |
| 4,176,815 A * | 12/1979 | Davidson et al. | ............... | 248/589 |
| 4,400,856 A * | 8/1983 | Tseng | ............... | 24/590.1 |
| 4,527,760 A * | 7/1985 | Salacuse | ............... | 248/108 |
| 4,747,570 A | 5/1988 | Takahashi | | |
| 5,026,016 A | 6/1991 | Lisowski | | |
| D329,192 S * | 9/1992 | Susac | ............... | D8/349 |
| 5,375,749 A * | 12/1994 | Oliva | ............... | 224/271 |
| 5,433,416 A * | 7/1995 | Johnson | ............... | 248/475.1 |
| 5,626,435 A * | 5/1997 | Wohlhuter | ............... | 403/348 |
| D380,219 S * | 6/1997 | Kinnard | ............... | D15/140 |
| 5,857,713 A * | 1/1999 | Horimoto | ............... | 285/81 |
| 6,119,878 A | 9/2000 | Zen | | |
| 6,161,741 A * | 12/2000 | French | ............... | 224/198 |
| 6,302,617 B1 * | 10/2001 | Rumpp | ............... | 403/348 |

(Continued)

FOREIGN PATENT DOCUMENTS

GB    2277675 A    11/1994

*Primary Examiner* — Terrell McKinnon
*Assistant Examiner* — Daniel J Breslin
(74) *Attorney, Agent, or Firm* — Porter, Wright, Morris & Arthur, LLP (57) ABSTRACT

A mounting system is disclosed for removably securing an object to a support surface. The mounting system includes a retaining clip having a rear wall to be secured to the support surface, and a front wall spaced from the rear wall to form a pocket therebetween with an open upper side, an aperture in the front wall opening into the pocket and extending to an upper side of the front wall, and a sliding clip having a sliding portion sized to be vertically slid into and out of the pocket, and an attachment portion forwardly extending form the sliding portion to be secured to the tablet computer. The attachment portion is closely received in the aperture when the sliding portion is in the pocket and has a thickness substantially equal to or less than a thickness of the front wall.

17 Claims, 5 Drawing Sheets

(56) References Cited

U.S. PATENT DOCUMENTS

| | | | |
|---|---|---|---|
| 6,371,424 B1 * | 4/2002 | Shaw | 248/222.12 |
| 6,409,475 B1 | 6/2002 | Ho | |
| 6,481,684 B1 * | 11/2002 | Farmer et al. | 248/309.3 |
| 6,519,144 B1 | 2/2003 | Henrie et al. | |
| 6,554,238 B1 | 4/2003 | Hibberd | |
| 6,637,707 B1 * | 10/2003 | Gates et al. | 248/224.7 |
| 6,702,604 B1 | 3/2004 | Moscovitch | |
| 6,758,454 B2 | 7/2004 | Smed | |
| 6,840,639 B2 * | 1/2005 | Zadro | 359/855 |
| 7,066,435 B2 | 6/2006 | Oddsen, Jr. et al. | |
| 7,077,372 B2 * | 7/2006 | Moran | 248/222.11 |
| 7,172,164 B2 | 2/2007 | Fuelling et al. | |
| 7,261,264 B2 * | 8/2007 | Moran | 248/222.11 |
| 7,270,309 B2 | 9/2007 | Burns et al. | |
| 7,594,823 B2 | 9/2009 | Moscovitch | |
| 7,673,838 B2 | 3/2010 | Oddsen, Jr. et al. | |
| 7,726,706 B2 * | 6/2010 | Moran | 292/194 |
| D658,972 S * | 5/2012 | Virgin | D8/349 |
| 8,215,605 B1 * | 7/2012 | Shepley | 248/558 |
| 8,292,521 B2 * | 10/2012 | Chamberlayne | 396/423 |
| 8,333,353 B1 * | 12/2012 | Silverman et al. | 248/205.6 |
| 2007/0170330 A1 | 7/2007 | Yeh et al. | |
| 2007/0294905 A1 | 12/2007 | Whittenburg | |
| 2009/0044825 A1 * | 2/2009 | Lawrence et al. | 132/295 |
| 2010/0054724 A1 * | 3/2010 | Chamberlayne | 396/423 |
| 2010/0132122 A1 * | 6/2010 | Hollingshead | 5/658 |

* cited by examiner

MOUNTING SYSTEM FOR REMOVABLY SECURING AN OBJECT TO A SURFACE

CROSS-REFERENCE TO RELATED APPLICATIONS

This application claims the priority benefit of U.S. provisional patent application No. 61/349,463 filed on May 28, 2010, the disclosure of which is expressly incorporated herein in its entirety by reference.

STATEMENT REGARDING FEDERALLY SPONSORED RESEARCH

Not Applicable

REFERENCE TO APPENDIX

Not Applicable

FIELD OF THE INVENTION

The field of the present invention generally relates to mounting systems and, more particularly, to mounting systems for removably securing objects, such as portable electronic devices and the like, to a support surface.

BACKGROUND OF THE INVENTION

Tablet computers and the like are becoming very popular with the public. Tablet computers are designed to be mobile so they are slate-shaped. They typically have a relatively large touch screen display on their forward side and nothing on their rear side. Input/output connectors and/or devises are typically located at sides of the tablet computer. It is noted that tablet computers are not of a clamshell design like lap tops, notebooks, etc. As a result, tablet computers do not have a cover for the display screen like lap tops but are more mobile than lap tops.

Tablet computers are typically used for watching videos, viewing photographs, reading electronic books, listening to music, interacting with the internet, data input where mobility is important etc. Because tablet computers are designed to be mobile, they typically are handheld during use. It is believed that tablet computers could become even more popular if they were even more versatile and it is further believed that they would be more versatile if they could be easily and removably mounted to support walls or surfaces and the like so that they could be used as a stationary display. Accordingly, there is a need for an improved mounting system for removably securing objects to a surface.

SUMMARY OF THE INVENTION

Disclosed are mounting systems for securing tablet computers and the like to a support surface. Disclosed is a mounting system comprising, in combination, a retaining clip having a rear wall to be secured to the support surface, and a front wall spaced from the rear wall to form a pocket therebetween with an open upper side, an aperture in the front wall opening into the pocket and extending to an upper side of the front wall, and a sliding clip having a sliding portion sized to be vertically slid into and out of the pocket, and an attachment portion forwardly extending form the sliding portion to be secured to the tablet computer. The attachment portion is closely received in the aperture when the sliding portion is in the pocket and has a thickness substantially equal to a thickness of the front wall.

Also disclosed is mounting system comprising, in combination, a tablet computer having a rear side and a front side with a touch screen display, a retaining clip having a rear wall to be secured to the support surface, and a front wall spaced from the rear wall to form a pocket therebetween with an open upper side, an aperture in the front wall opening into the pocket and extending to an upper side of the front wall, and a sliding clip having a sliding portion sized to be vertically slid into and out of the pocket, and an attachment portion forwardly extending form the sliding portion and secured to the rear side of the tablet computer. The attachment portion is closely received in the aperture when the sliding portion is in the pocket and has a thickness substantially equal to a thickness of the front wall.

Also disclosed is a mounting system for removably securing an object to a support surface which comprises, in combination a retaining clip and a frame clip. The retaining clip has a rear wall to be secured to the support surface, and a front wall spaced from the rear wall to form a pocket therebetween with an open upper side. An aperture in the front wall opens into the pocket and extends to an upper side of the front wall. The frame clip has a plurality of sliding clips connected together. Each of the sliding clips has a sliding portion sized to be vertically slid into and out of the pocket and an attachment portion forwardly extending form the sliding portion to be secured to the object. The attachment portion is closely received in the aperture when the sliding portion is in the pocket.

From the foregoing disclosure and the following more detailed description of various preferred embodiments it will be apparent to those skilled in the art that the present invention provides a significant advance in the technology and art of mounting systems. Particularly significant in this regard is the potential the invention affords for providing a relatively low cost, versatile, and easy to use mounting system for tablet computers and the like. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 3:
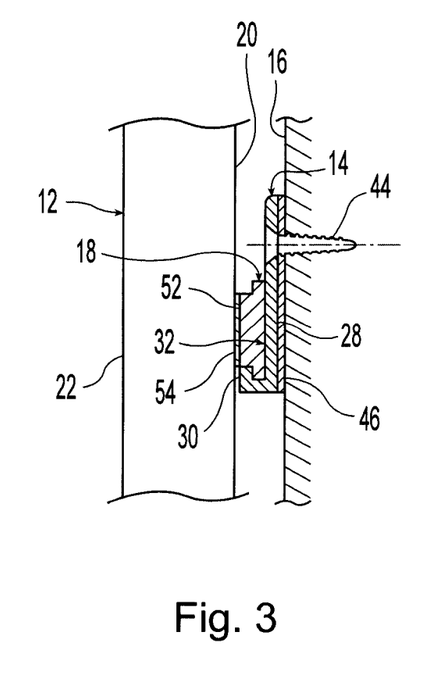
FIG. 3 is a fragmented side elevational view, partially in cross-section, of the mounting system of FIGS. 1 and 2 securing the tablet computer to a support wall.
Figures 4, 5:
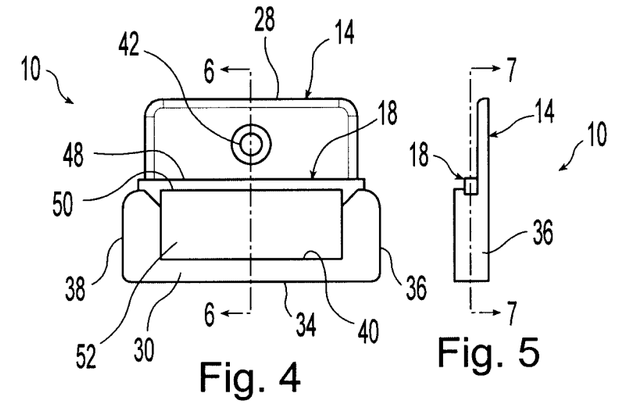
FIG. 4 is a front elevational view of the mounting system of FIGS. 1 to 4.
FIG. 5 is a right side elevational view of the mounting system of FIG. 5.
Figure 6:
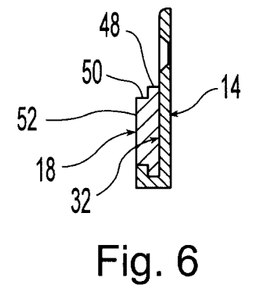
FIG. 6 is a cross-sectional view taken along line 6-6 of FIG. 4.
Figure 7:
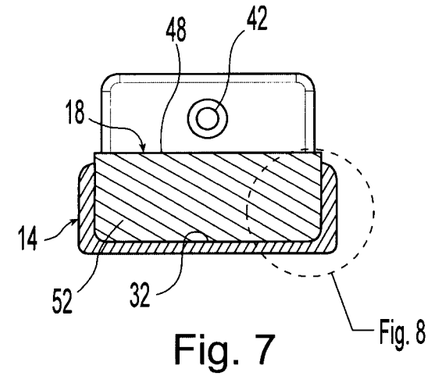
FIG. 7 is a cross-sectional view taken along line 7-7 of FIG. 5.
Figure 8:
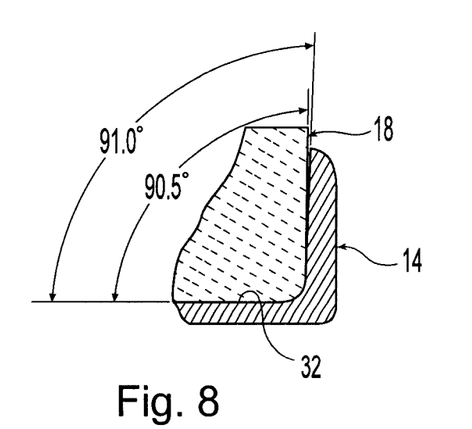
FIG. 8 is an enlarged fragmented view of a portion of FIG. 7.

It should be understood that the appended drawings are not necessarily to scale, presenting a somewhat simplified representation of various preferred features illustrative of the basic principles of the invention. The specific design features of the mounting systems as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the mounting systems illustrated in the drawings. In general, up or upward generally refers to an upward direction within the plane of the paper in FIG. 3 and down or downward generally refers to a downward direction within the plane of the paper in FIG. 3. Also in general, front or forward generally refers to a direction toward the left in FIG. 3 and rear or rearward generally refers to a direction toward the left in FIG. 3.

DETAILED DESCRIPTION OF CERTAIN PREFERRED EMBODIMENTS

It will be apparent to those skilled in the art, that is, to those who have knowledge or experience in this area of technology, that many uses and design variations are possible for the mounting systems disclosed herein. The following detailed discussion of various alternative and preferred embodiments will illustrate the general principles of the invention with regard to a mounting system for a portable electronic device, and more specifically, for a tablet computer. The term "portable electronic device" is used in the specification and claims to mean a handheld electronic device that utilizes rechargeable batteries as a power source including, but not limited to, tablet computers such as, for example, an iPad, smart phones such as, for example, an iPhone, personal digital assistants (PDAs), digital cameras, media players such as, for example, an iPod Touch, video game players, messaging systems, portable DVD players, portable televisions, eBook readers or eReaders such as, for example, a Nook, and the like. The term "tablet computer" is used in this specification and in the claims to mean a mobile slate-shaped electronic device having a touch screen or graphics tablet/screen hybrid as an input device using a finger, stylus, or digital pen and is configured for use as a complete general-purpose computer, for Internet access only, or for any other special use. The term "tablet computer" is intended to include, but is not limited to, tablet PCs such as an iPad, slate PCs, slate tablet PCs, tablet net books, and the like. Other embodiments of the present invention suitable for other applications will be apparent to those skilled in the art given the benefit of this disclosure such as, for example, clip boards and file holders for medical records, picture frames, and the like.

Referring now to the drawings, FIGS. 1 to 8 show a mounting system 10 for a tablet computer 12 according to the present invention. The illustrated mounting system or clip assembly 10 includes a retaining clip 14 secured to a substantially vertical support wall or surface 16, and a sliding clip 18 secured to the tablet computer 12 which can be selectively inserted into the retaining clip 14 to secure the tablet computer 12 to the wall 16 in a manner that the tablet computer 12 can be viewed and operated and selectively withdrawn from the retaining clip 14 to easily remove the tablet computer 12 from the wall 16.

Figure 1:
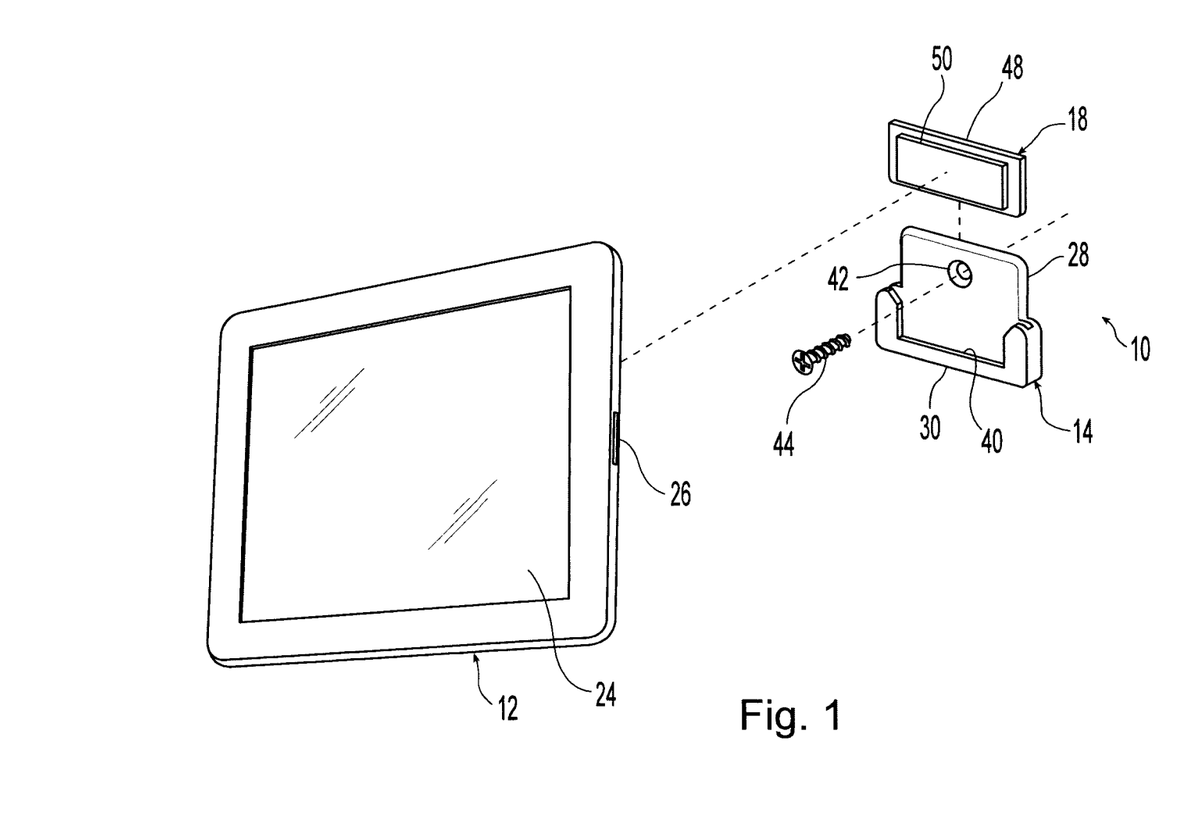
FIG. 1 is a perspective exploded view of a tablet computer with a mounting system according to a first embodiment of the present invention, wherein the mounting system is enlarged for clarity.
Figure 2:
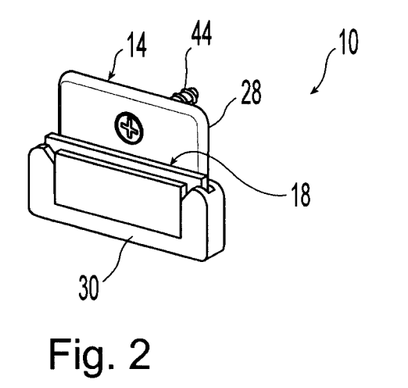
FIG. 2 is a perspective view of the mounting system of FIG. 1.

The illustrated tablet computer 12 is generally rectangular shaped and has a substantially planar rear side 20 and a substantially planar front side 22. The illustrated tablet computer 12 is sized to be mobile and includes internal processor, memory, and battery. The illustrated front side 22 is provided with a touch screen video display 24 which acts as an input/output device and electrical connectors 26 are provided on sides for attaching additional devices and/or a power cable. A suitable tablet computer 12 is an iPad available from Apple Inc. of Cupertino, Calif. It is noted that any other suitable tablet computer and the like can alternatively be utilized.

The illustrated retaining clip 14 has a planar rear wall to be secured to the support wall 16 and a front wall 30 spaced from the rear wall 28 to form a pocket 32 therebetween. The illustrated rear wall 28 has a height greater than the front wall 30 and the pocket 32. The illustrated front and rear walls 28, 30 are each rectangular shaped so that the pocket 32 therebetween is generally rectangular shaped. The illustrated pocket 32 has an open upper side to form an inlet for the pocket 32 in the form of a laterally-extending, upward-facing elongate slot. Bottom and left and right side walls 34, 36, 38 close the lower and lateral sides of the pocket 32. An aperture 40 is located in the front wall 30 which opens into the pocket 32 and extends to the upper side or edge of the front wall 30 at the slot so that the aperture 40 forms a notch in the front wall 30. The illustrated aperture 40 is rectangular shaped and smaller than the pocket 32 so that the illustrated front wall 30 is generally U-shaped having a laterally extending bottom flange or portion located at a bottom of the pocket 32 and a pair of side flanges or portions upwardly extending from ends of the bottom portion at lateral sides of the pocket 32. The pocket 32 and the aperture 40 are sized and shaped to cooperate with the sliding clip 18 as described in more detail hereinafter. It is noted that the retaining clip 14 can alternatively have any other suitable form.

The illustrated rear wall 28 of the retaining clip 14 has an opening 42 sized for receiving a mechanical fastener 44 to secure the retaining clip 14 to the support wall 16. The mechanical fastener 44 can be a thread forming screw such as, for example, screw 96068A105 available from the McMaster-Carr Company. It is noted that any other suitable fastener can alternatively be utilized. The illustrated rear wall 28 also has a layer of pressure sensitive adhesive 46 at a rear side of the rear wall 28 to secure the retaining clip 14 to the support wall 16. The pressure sensitive adhesive 46 can be two sided tape such as, for example, 3M VHB 2-way tape available from the 3M Company. It is noted that any other suitable pressure sensitive adhesive 46 can alternatively be utilized. It is also noted that alternatively only one of the mechanical fastener 44 and the pressure sensitive adhesive 46 or any other type of combination of fastening means can be utilized.

Figure 9:
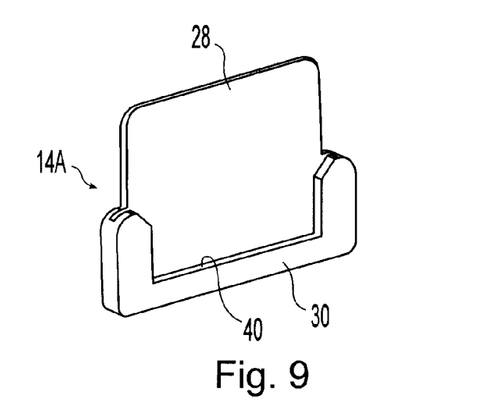
FIG. 9 is a perspective view of an alternative attachment clip for the mounting system of FIGS. 1 to 8.

FIG. 9 illustrates an alternative retaining clip 14A which is substantially the same as the retaining clip 14 described herein above except that the fastener opening 42 is eliminated. This retaining clip 14A illustrates that only the pressure sensitive adhesive 46 can be utilized to secure the retaining clip 14 to the support wall 16. Utilizing only pressure sensitive adhesive 46 can be particularly advantageous when the surface of the support wall 16 is covered with a smooth tile and the like.

Figure 10:
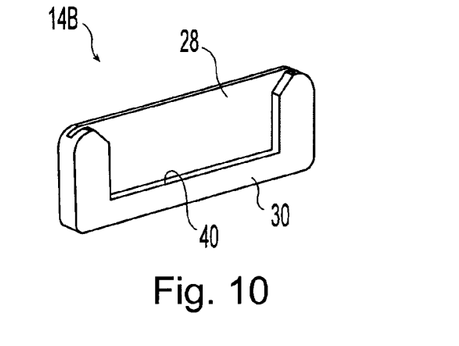
FIG. 10 is a perspective view of another alternative attachment clip for the mounting system of FIGS. 1 to 8.

FIG. 10 illustrates another alternative retaining clip 14B which is substantially the same as the retaining clips 14, 14A described herein above except that the rear wall 28 has substantially the same height as front wall 30. This retaining clip 14B illustrates that the size of the retaining clip can be reduced in some applications that do not require the mechanical fastener 44 for attachment to the support wall 16.

The illustrated sliding clip 18 has a sliding portion 48 sized to be vertically slid into and out of the pocket 32 and an attachment portion 50 forwardly extending form the sliding portion 48 and secured to the rear side 20 of the tablet computer 12. The illustrated sliding portion 48 is rectangular shaped and sized to be closely received in the pocket 32 of the retaining clip 14. The illustrated sliding portion 48 has a thickness substantially equal to a thickness depth of the pocket 32. The sliding portion 48 preferably has a thickness substantially equal to or less than the thickness depth of the pocket 32 so that it is closely received in the pocket with minimal play therein. The illustrated attachment portion 50 is rectangular shaped and sized to be closely received in the aperture 40 of the retaining clip 14 when the sliding portion 48 is in the pocket 32 of the retaining clip 14. The illustrated attachment portion 50 has a width smaller than a width of the sliding portion 48 so that lateral sides of the attachment portion 50 are spaced laterally inward from lateral sides of the sliding portion 48. The illustrated attachment portion 50 also has a height smaller than a height of the sliding portion 48 so that top and bottom sides of the attachment portion 50 are spaced vertically inward from top and bottom sides of the sliding portion 48. Thus, all of the edges of the illustrated attachment portion 50 are spaced inward from the adjacent edges of the sliding portion 48. It should be appreciated, however, that the upper edge of the attachment portion 50 can extend to the upper edge of the sliding portion 48 or beyond if desired. The illustrated attachment portion 50 has a thickness equal to a thickness of the front wall 30 of the retaining clip 14, that is, equal to the depth of the aperture 40. The illustrated attachment portion 50 preferably has a thickness substantially equal to or less than the thickness of the front wall 30 of the retaining clip 14 so that the tablet computer essentially engages the front wall 30 of the retaining clip 14. It is noted that the sliding clip can alternatively have any other suitable form.

The illustrated attachment portion 50 of the sliding clip 18 has a planer front side 52 provided with a layer of pressure sensitive adhesive 54 to secure the sliding clip 18 to the tablet computer 12 or other object to be secured to the wall 16. The pressure sensitive adhesive 54 can be two sided tape such as, for example, 3M VHB 2-way tape available from the 3M Company. It is noted that any other suitable pressure sensitive adhesive 54 can alternatively be utilized. It is also noted that alternatively any other suitable type of fastening means can be utilized.

The illustrated sliding portion 48 of the sliding clip 18 and the illustrated pocket 32 of the retaining clip 14 are provided with different draft angles so that the fit gets tighter as the sliding portion 48 is slid further into the pocket 32. The illustrated draft angle of the sliding portion 48 is about 0.5 degrees and the illustrated draft angle of the pocket 32 is about 1.0 degrees. It is noted however that the draft angles can alternatively be any other suitable sizes.

Figure 11:
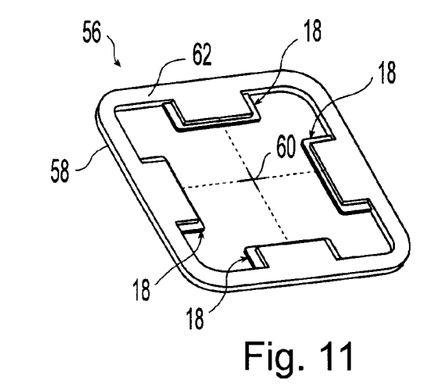
FIG. 11 is a front perspective view of a clip frame for use in the mounting system of FIGS. 1 to 8 in place of the sliding clip.
Figure 11A:
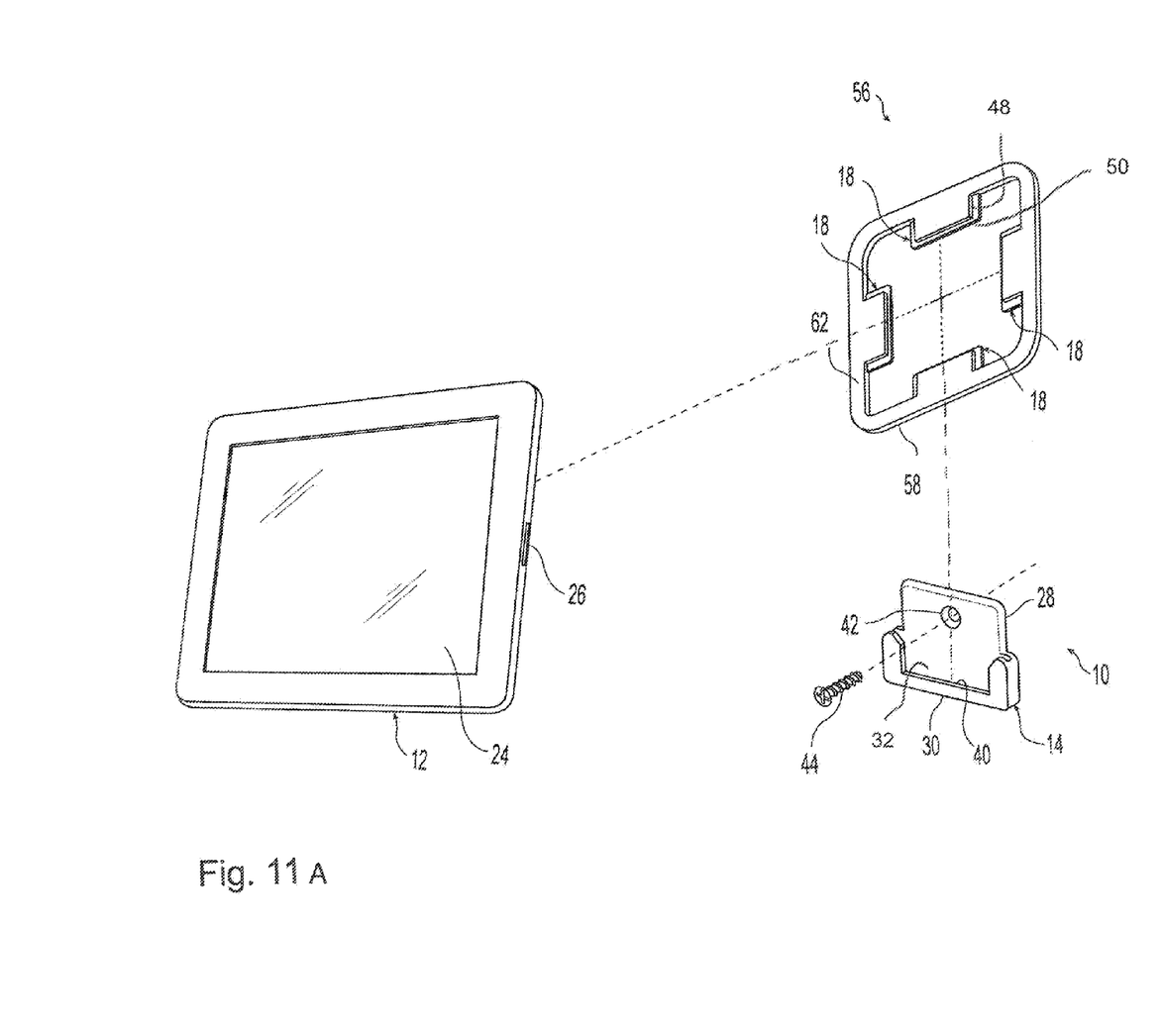
FIG. 11A is a perspective exploded view similar to FIG. 1 but with the clip frame of FIG. 11 in place of the sliding clip.
Figure 12:
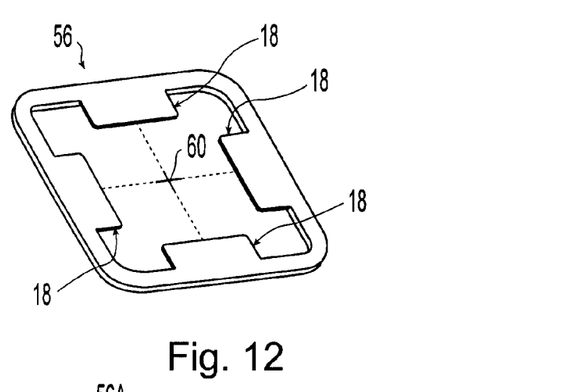
FIG. 12 is a rear perspective view of the clip frame of FIG. 11.

FIGS. 11, 11A, and 12 illustrate a clip frame 56 which can be alternatively be used in place of the single sliding clip 18 described herein above. The clip frame 56 includes a plurality of the sliding clips 18 connected by a common frame 58 and oriented in different directions so that the tablet computer 12 can be secured to the retaining clip 14 in different orientations such as, for example, both portrait and landscape directions. The illustrated sliding clips 18 of the clip frame 56 are substantially the same as those described hereinabove except that the top of the attachment portion 50 is not inwardly spaced from the top of the sliding portion 48. The illustrated clip frame 56 includes four of the sliding clips 18 where each sliding clip 18 is oriented at a right angle (90 degrees) to the adjacent sliding clips 18 and opposed (180 degrees) to the opposite sliding clip 18 so that the tablet computer 12 can be secured in any of 4 orthogonal positions. Thus, when the frame clip 56 is secured to the back of the tablet computer 12 with the sliding clips 18 parallel with the orthogonal edges of the tablet computer 12, the tablet computer 12 can be mounted in either of the two portrait orientations and either of the two landscape orientations as desired. It is noted, however, that the clip frame 56 can alternatively have a fewer or greater number of the sliding clips 18 and/or the sliding clips 18 can alternatively be oriented in other directions. The illustrated sliding clips 18 extend inwardly toward a center 60 of the frame 58 but can alternatively extend in an outward direction if desired. The illustrated frame 58 is generally square with rounded corners bit it is noted that the frame 58 can alternatively have any other desired shape. The illustrated frame 58 has a planer front side 62 that is contiguous with the planar front sides 52 of the sliding clip attachment portions 50 so that the entire surface can provided with a layer of pressure sensitive adhesive 54 if desired.

Figure 13:
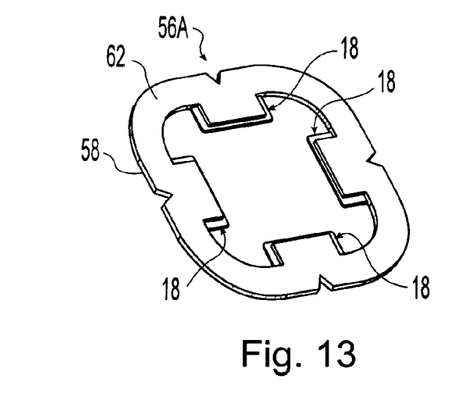
FIG. 13 is a front perspective view of another clip frame for use in the mounting system of FIGS. 1 to 8 in place of the sliding clip.
Figure 14:
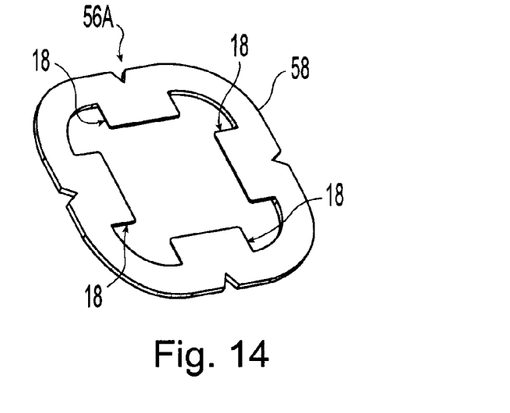
FIG. 14 is a rear perspective view of the clip frame of FIG. 13.

FIGS. 13 and 14 illustrate an alternative clip frame 56A which is substantially the same as the clip frame 56 described herein above except that the frame 58 has a different shape. The illustrated clip frame 56A is nearly circular. This clip frame 56A illustrates that the frame 56 can have alternative configurations as desired.

The illustrated retaining and sliding clips 14, 18 are separate components and are preferably molded components. The retaining and sliding clips 14, 18 are preferably molded of a suitable plastic or polymer material but it is noted that any other suitable material can alternatively be utilized. The color of the molded plastic can be of any suitable type such as, for example, crème, black, or clear. The plastic components 14, 18, 56 and the layers of adhesive 46, 54 are each preferably clear so that they are less apparent when the tablet computer 12 or other object is unsecured to the retaining clip 14 and the wall 16.

To secure the tablet computer 12 to the support wall 16, the retaining clip 14 is secured to the support wall 16 in a desired location with the pressure sensitive adhesive 46. The mechanical fastener 44 is then inserted through the opening 42 in the rear wall 28 and into the support wall 16. The sliding clip 18 is secured to the rear side 20 of the tablet computer 12 in a desired orientation. The sliding portion 48 of the sliding clip 18 is then moved downwardly into the pocket 32 of the retaining clip 14 secured to the support wall 16 until the sliding portion 48 is fully inserted into the pocket 32 and engaging the bottom of the pocket 32. It is noted that the front wall 30 of the retaining clip 14 engages the sides and the bottom of the sliding portion 48 of the sliding clip 18 to retain the sliding clip 18 to the retaining clip 14. It is also noted the illustrated attachment portion 50 of the sliding clip 18 does not extend out of the aperture 40 so, at most, only the thickness of the adhesive 54 separates the retaining clip 14 from the rear side 20 of the tablet computer 12. It is noted that the thickness of the attachment portion 50 can be sized slightly smaller so that the spacing between the tablet computer 12 and the retaining clip 14 is less than the thickness of the layer of adhesive 54. Thus, the rear side 20 of the tablet computer 12 effectively engages the front wall 30 of the retaining clip 14 to minimize loading of the mounting system 10. To remove the tablet computer 12 from the support wall 16, the tablet computer 12 is simply raised so that the sliding portion 48 moves up and out of the pocket 32. The tablet computer 12 can again be secured and removed in this manner whenever desired.

Any of the features or attributes of the above the above described embodiments and variations can be used in combination with any of the other features and attributes of the above described embodiments and variations as desired.

It is apparent from the above detailed description of the present invention, that the illustrated mounting system 10 can easily safely store the tablet computer 12 when not in use. It is also apparent that the mounting system 10 can support the tablet computer 12 on the wall 16 so that the tablet computer 12 can be used as a stationary video or photograph display and the like.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A mounting system comprising, in combination:
   an object to be removably secured to a support surface;
   a retaining clip having a rear wall to be secured to the support surface, and a front wall spaced from the rear wall to form a pocket therebetween with an open upper side and a closed lower side;
   an aperture in the front wall opening into the pocket and extending to an upper side of the front wall;
   a sliding clip having a sliding portion sized to be vertically slid into and out of the pocket, and an attachment portion forwardly extending from the sliding portion and secured to the object;
   wherein a rear surface of the sliding portion of the sliding clip and a front surface of the retaining clip rear wall engaged by the sliding portion of the sliding clip as the sliding portion is vertically slide into and out of the pocket are each planar so that the sliding portion freely slides into and out of the pocket and is retained in the pocket only by friction;
   double-sided adhesive tape directly secured to a forward side of the attachment portion and directly secured to a rear side of the object to secure the sliding clip to the object; and
   wherein a thickness of the sliding portion is substantially equal to or less than a thickness of the pocket so that the sliding portion is closely received in the pocket and there is no free-play of the sliding portion relative to the retaining clip within the pocket in the forward and rearward directions, the attachment portion is closely received in the aperture when the sliding portion is in the pocket, and the attachment portion has a thickness no more than a thickness of the front wall so that the object is spaced from the front wall of the retaining clip a distance no more than a thickness of the double-sided adhesive tape and there is substantially no free-play of the object relative to the retaining clip in the forward and rearward directions;
   wherein the sliding portion of the sliding clip and the pocket of the retaining clip are provided with different draft angles so that the fit gets tighter as the sliding portion is slid into the pocket.

2. The mounting system according to claim 1, wherein the rear wall has an opening for a fastener to secure the retaining clip to the support wall.

3. The mounting system according to claim 1, wherein the attachment portion of the sliding clip and the aperture of the retaining clip are each rectangular shaped.

4. The mounting system according to claim 1, wherein the attachment portion of the sliding clip and the sliding portion of the sliding clip are each rectangular shaped, the attachment portion has a width smaller than a width of the sliding portion so that lateral sides of the attachment portion are spaced laterally inward from lateral sides of the sliding portion, and the attachment portion has a height smaller than a height of the sliding portion so that the bottom side of the attachment portion is spaced vertically inward from the bottom side of the sliding portion.

5. The mounting system according to claim 1, wherein the object is an electronic device having a touch screen display.

6. A tablet computer mounting system comprising, in combination:
   a tablet computer having a rear side and a front side with a touch screen display;
   a retaining clip having a rear wall and a front wall spaced from the rear wall to form a pocket therebetween with an open upper side and a closed lower side;
   an aperture in the front wall opening into the pocket and extending to an upper side of the front wall;
   a sliding clip having a sliding portion sized to be vertically slid into and out of the pocket, and an attachment portion forwardly extending from the sliding portion and secured to the rear side of the tablet computer;
   wherein a rear surface of the sliding portion of the sliding clip and a front surface of the retaining clip rear wall engaged by the sliding portion of the sliding clip as the sliding portion is vertically slid into: and out of the pocket are each planar so that the sliding portion freely slides into and out of the pocket and is retained in the pocket only by friction;
   double-sided adhesive tape directly secured to a forward side of the attachment portion and directly secured to a rear side of the tablet computer to secure the sliding clip to the tablet computer; and
   wherein a thickness of the sliding portion is substantially equal to or less than a thickness of the pocket so that the sliding portion is closely received in the pocket and there is no free-play of the sliding portion relative to the retaining clip within the pocket in the forward and rearward directions, the attachment portion is closely received in the aperture when the sliding portion is in the pocket, and the attachment portion has a thickness no more than a thickness of the front wall so that the tablet computer is spaced from the front wall of the retaining clip a distance no more than a thickness of the double-sided adhesive tape and there is substantially no free-play of the tablet computer relative to the retaining clip in the forward and rearward directions;

wherein the sliding portion of the sliding clip and the pocket of the retaining clip are provided with different draft angles so that the fit gets tighter as the sliding portion is slid into the pocket.

7. The tablet computer mounting system according to claim 6, wherein the rear wall has an opening for a fastener to secure the retaining clip to a support surface.

8. The tablet computer mounting system according to claim 6, wherein the attachment portion of the sliding clip and the aperture of the retaining clip are each rectangular shaped.

9. The tablet computer mounting system according to claim 6, wherein the attachment portion of the sliding clip and the sliding portion of the sliding clip are each rectangular shaped, the attachment portion has a width smaller than a width of the sliding portion so that lateral sides of the attachment portion are spaced laterally inward from lateral sides of the sliding portion, and the attachment portion has a height smaller than a height of the sliding portion so that the bottom side of the attachment portion is spaced vertically inward from top and bottom sides of the sliding portion.

10. A mounting system comprising, in combination:
an object to be removably secured to a support surface;
a retaining clip having a rear wall to be secured to the support surface, and a front wall spaced from the rear wall to form a pocket therebetween with an open upper side;
an aperture in the front wall opening into the pocket and extending to an upper side of the front wall;
a frame clip having a plurality of sliding clips connected together, wherein one of the plurality of sliding clips is selected to be received in the retaining clip while the other of the plurality of sliding clips are unused;
wherein each of the sliding clips has a sliding portion sized to be vertically slid into and out of the pocket, and an attachment portion forwardly extending from the sliding portion and secured to the object;
wherein a rear surface of the sliding portion of the sliding clips and a front surface of the retaining clip rear wall engaged by the sliding portion of the sliding clips as the sliding portion is vertically slid into and out of the pocket are each planar so that the sliding portion freely slides into and out of the pocket and is retained in the pocket only by friction;
wherein each of the sliding clips has double-sided adhesive tape directly secured to a forward side of the attachment portion and directly secured to a rear side of the object to secure the sliding clip to the object; and
wherein a thickness of the sliding portion of each of the sliding clips is substantially equal to a thickness of the pocket so that the sliding portion is closely received in the pocket, the attachment portion is closely received in the aperture when the sliding portion is in the pocket, and the attachment portion has a thickness substantially equal to a thickness of the front wail so that the object is spaced from the front wall of the retaining clip a distance no more than a thickness of the double-sided adhesive tape and there is substantially no free-play of the object relative to the retaining clip in the forward and rearward directions.

11. The mounting system according to claim 10, wherein the sliding clips are oriented in different directions.

12. The mounting system according to claim 10, wherein the clip frame includes four of the sliding clips.

13. The mounting system according to claim 12, wherein each of the sliding clips are oriented at a right angle to adjacent ones of the sliding clips and opposed to an opposite one of the sliding clips so that the object is secured to the retaining clip in any one of four orthogonal orientations.

14. The mounting system according to claim 13, wherein the sliding clips extend inwardly toward a center of the clip frame.

15. The mounting system according to claim 10, wherein the sliding clips extend inwardly toward a center of the clip frame.

16. The mounting system according to claim 10, wherein the object is an electronic device having a touch screen display.

17. The mounting system according to claim 10, wherein a thickness of the sliding portion of each of the sliding clips is equal to a thickness of the pocket so that the sliding portion is closely received in the pocket and there is no free-play of the sliding portion relative to the retaining clip within the pocket in the forward and rearward directions, and wherein the attachment portion has a thickness no more than a thickness of the front wall,

\* \* \* \* \*